(12) United States Patent
Abdullah et al.

(10) Patent No.: US 6,840,766 B2
(45) Date of Patent: Jan. 11, 2005

(54) REFRACTORY VESSEL AND LINING THEREFOR

(75) Inventors: Zia Abdullah, Federal Way, WA (US); John Peter Gorog, Kent, WA (US)

(73) Assignee: Weyerhaeuser Company, Federal Way, WA (US)

(*) Notice: Subject to any disclaimer, the term of this patent is extended or adjusted under 35 U.S.C. 154(b) by 0 days.

(21) Appl. No.: 10/757,085

(22) Filed: Jan. 14, 2004

(65) Prior Publication Data

US 2004/0146828 A1 Jul. 29, 2004

Related U.S. Application Data

(63) Continuation of application No. 10/095,269, filed on Mar. 11, 2002, now Pat. No. 6,725,787.

(51) Int. Cl.[7] .................................................. F23M 5/00
(52) U.S. Cl. ........................................ 432/251; 110/336
(58) Field of Search ................................ 432/248, 245, 432/251; 110/331–336; 266/280, 283, 285, 286; 52/396.01, 396.08, 396.09; 162/30.1, 30.11

(56) References Cited

U.S. PATENT DOCUMENTS

| | | | |
|---|---|---|---|
| 1,463,971 A | 8/1923 | Poppenhusen | |
| 1,830,384 A | * 11/1931 | Crysler | 110/336 |
| 2,986,247 A | 5/1961 | Schnitt et al. | |
| 3,375,621 A | 4/1968 | Curtis et al. | |
| 3,489,401 A | 1/1970 | Merdian et al. | |
| 3,528,647 A | 9/1970 | Hyde | |
| 3,973,076 A | 8/1976 | Scott, Jr. et al. | |
| 3,991,899 A | 11/1976 | Vaessen | |
| 4,414,023 A | 11/1983 | Aggen et al. | |
| 4,505,210 A | 3/1985 | Schuck et al. | |
| 4,637,823 A | 1/1987 | Dach | |
| 4,768,445 A | * 9/1988 | Vollhardt et al. | 588/228 |
| 5,063,028 A | 11/1991 | Humble et al. | |
| 5,257,929 A | 11/1993 | Gnjatovic et al. | |
| 5,873,329 A | * 2/1999 | Heering et al. | 122/7 R |
| 6,439,137 B1 | 8/2002 | Groen et al. | |

* cited by examiner

Primary Examiner—Gregory Wilson
(74) Attorney, Agent, or Firm—Christensen O'Connor Johnson Kindness PLLC

(57) ABSTRACT

A refractory vessel that can be used as a gasifier for black liquor includes a generally cylindrical metal shell having a dome. A refractory shell has a cylindrical portion spaced inwardly from the metal shell and a dome portion that is spaced inwardly from the metal dome. The refractory shell is sized to provide an expansion gap between the liner and the metal shell. A selectively crushable liner is positioned in the gap. The liner has a predetermined yield stress that will provide controlled resistance to expansion of the refractory shell.

6 Claims, 2 Drawing Sheets

REFRACTORY VESSEL AND LINING THEREFOR

RELATED APPLICATIONS

This application is a continuation of U.S. application Ser. No. 10/095,269, filed Mar. 11, 2002, now U.S. Pat. No. 6,725,787, the benefit of the priority of which is hereby claimed under 35 U.S.C. § 120.

FIELD OF THE INVENTION

The present invention relates to refractory vessels, and more particularly, to materials for lining refractory vessels.

BACKGROUND OF THE INVENTION

Black liquor is a by-product of the wood pulping process. Black liquor is a mixture of hydrocarbon, caustic, chlorine and other corrosive chemicals. It is normally completely combusted in a recovery boiler. Inorganic chemicals including sodium sulfate and sodium sulfide are recovered for reuse in the pulping process. Heat produced by the complete combustion is converted to steam, which in turn is used to produce process heat and/or electrical power. An alternative device proposed for recovering inorganic chemicals from black liquor is a gasifier. In a gasifier, the black liquor is burned in a sub stoichiometric atmosphere to produce a combustible gas. Inorganic salts are recovered in the process. The combustible gases can be used directly to fuel a gas turbine, or combusted in a power boiler.

Low pressure gasification requires an insulated environment, which is obtained through a refractory lined vessel. Refractory vessels of current design for use as gasifiers employ a stainless steel jacket and a fused-cast alumina liner. The alumina liner normally has a first inner layer of blocks comprising both alpha and beta alumina and a second outer layer of blocks comprising beta alumina. A small expansion allowance is provided between the outer layer of beta alumina blocks and the stainless steel jacket.

After vessels of this design are operated for a few months, it has been found that the refractory materials react with the soda in the liquor and expand to completely consume the normal expansion allowance provided between the refractory and the stainless steel jacket. At this point, the refractory layers begin to press against the inside of the stainless steel jacket. This situation causes early failure in the refractory materials themselves and plastic deformation of the stainless steel jacket. As a consequence, refractory linings of a conventional design have been unsatisfactory for use in a black liquor gasifier.

SUMMARY OF THE INVENTION

As a result of a study of a prior gasifier, it has been found that the alumina refractory material has not only been subject to thermal expansion, which was known in the prior art, but also is subject to chemical expansion. Chemical expansion is caused by sodium, present in the black liquor, combining with the refractory material to produce sodium aluminate. It has been found that sodium aluminate expands on the order of 130% relative to the original alumina. This causes both greater radial and vertical expansion in the refractory material as the vessel is used over time. This additional expansion of the refractory material presses outwardly on the interior of the stainless steel jacket and places it under stress. Chlorine and moisture present on the inner surface of the stainless steel pressure vessel, loaded in tension by the refractory expansion cause stress corrosion cracking of the stainless steel vessel, subjecting it to early failure. This internal stress caused by the thermal and chemical expansion of the refractory must be controlled to an acceptable level. Also, for the purpose of pressure vessel design as per ASME code, it is necessary to clearly and explicitly define the "secondary stress" due to the expansion of the refractory lining. Secondary stresses are all stresses not due to the internal gas pressure.

The present invention therefore provides a refractory liner for a vessel which accommodates the expansion of the refractory lining and provides a known secondary stress on the pressure vessel. The vessel has a cylindrical metal shell preferably having a hemispherical dome. A refractory shell has a cylindrical portion spaced inwardly from the metal shell and preferably a hemispherical dome portion spaced inwardly from the hemispherical dome of the metal shell. The refractory shell is sized to leave a uniform expansion gap between the liner and the shell in the cylindrical section.

In a preferred embodiment, the center of curvature of the hemispherical dome comprised of the refractory is at a lower elevation than the center of curvature of the hemispherical dome comprised of the metal shell. This provides an expansion gap which increases in thickness as the dome curves upwardly and inwardly. This crescent shaped gap in the dome allows for radial expansion of the refractory dome as well as axial expansion of the cylindrical section. The entire refractory dome rises in the vertical direction as the cylindrical section expands. A selectively crushable liner is positioned in the gap. The liner has a predetermined yield and crushing stress that will provide controlled resistance to expansion of the refractory shell. The resistance provided is significantly less than the yield strength of the metal shell while providing sufficient resistance to expansion of the refractory shell to allow controlled growth of the shell. Since the mechanical characteristics of the crushable liner are known, the internal secondary stress on the steel shell can be accurately described.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
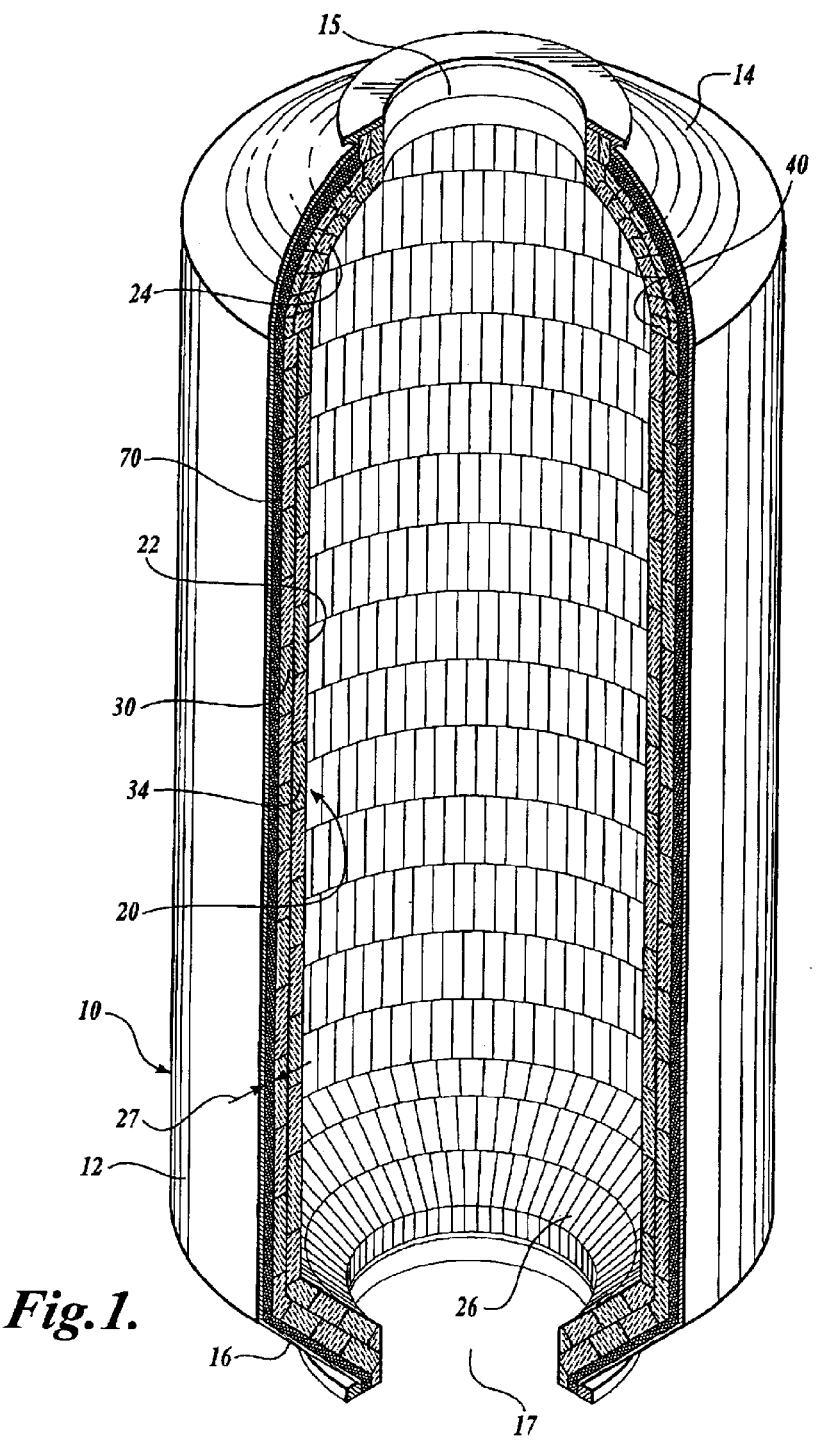
FIG. 1 is an isometric view of a refractory vessel constructed in accordance with the present invention with a vertical pie-shaped segment removed to expose the refractory lining and crushable liner.

Referring first to FIG. 1, the refractory vessel 10 has an outer metal shell 12. The outer metal shell is preferably comprised of carbon steel but can be composed of any other suitable material with adequate strength and corrosion resistance. The upper portion of the metal shell comprises a dome 14 that terminates in an upper opening 15. The bottom portion of the metal shell 12 merges into a support cone 16 having a central bottom opening 17. A refractory liner 20 has a cylindrical portion 22 positioned radially inward from the shell 12 and also has a dome portion 24 and a bottom cone portion 26. A cylindrical expansion gap 27 is provided between the metal shell 12 and the cylindrical portion 22 of the refractory liner 20. The dome portion of the refractory liner is positioned inwardly and below the dome 14 of the metal shell.

Figure 2:
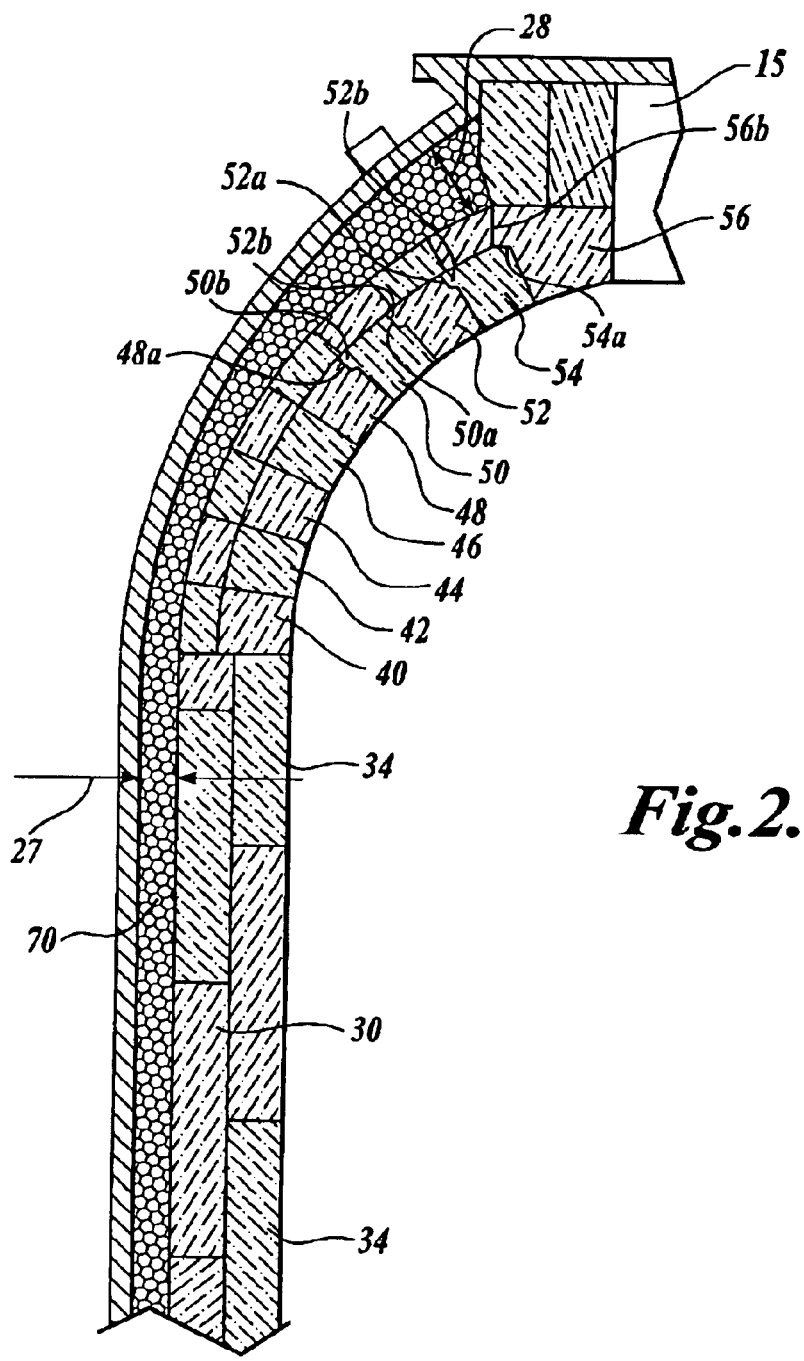
FIG. 2 is an enlarged view of a portion of the vertical wall and dome of the refractory vessel shown in FIG. 1.

Referring to FIGS. 1 and 2, in a preferred embodiment, the upper portion 24 of the refractory liner 20 is hemispherical in shape. The center of curvature of the hemispherical dome 24 of the refractory liner 20 is at a lower elevation than the center of curvature of the hemispherical dome portion 14 of the metal shell 12. This provides an expansion gap 28 which increases in thickness as the two hemispherical portions 14 and 16 extend upwardly and inwardly toward the opening 15. Expansion gap 28 connects with the cylindrical expansion gap 27. A selectively crushable layer 70 is positioned between the refractory liner 30 and the outer shell 12. The crushable layer 70 is described in more detail below.

The refractory liner 20 has an inner layer of blocks 34 and an outer layer of blocks 30. The outer layer of blocks 30 are stacked on each other to form an outer refractory shell and the inner layer of blocks are stacked on each other to form an inner refractory shell. The blocks in the inner layer are preferably comprised of alumina and most preferably of alpha and beta alumina. The blocks in the outer layer are positioned in intimate contact with the outside of the inner layer of blocks and are preferably composed of beta alumina. However, other refractory materials with suitable strength and resistance to chemical attack could be used. The crushable layer 70 is positioned between the outer surface of the outer layer of blocks 30 and the interior surface of the metal shell 12. The width of the gaps 27 and 28 are adjusted based on the measured or expected expansion of the refractory material.

Referring to FIGS. 1 and 2, the hemispherical dome 24 of the refractory liner is formed by a plurality of rings of blocks 40, 42, 44, 46, 48, 50, 52, 54 and 56 positioned on the blocks 30 and 34 forming the inner and outer cylindrical shell. Blocks 40 form a first horizontal ring comprising the base of the hemispherical refractory dome. Successive layers of blocks 42, 44 and 46 are formed into rings of lesser diameter to form the bottom portion of the inwardly and upwardly sloping dome. Each of the successive layers have flat upper and lower surfaces that are appropriately angled relative to each other to form the dome shape. The next successive layer of blocks 48 also has a lesser diameter than the previous layer of blocks 46. Blocks 48 have a flat bottom surface formed to contact the flat top of the blocks 46 of the previous layer. However, the upper surface of the layer blocks 48 has a downwardly extending circular keyway 48a positioned in upper surface of the blocks 48 adjacent their outer edges. The next successive layer of blocks 50 has a lesser diameter than the layer of blocks 48 and has a downwardly extending circular key 50b positioned adjacent the lower outer edges of the blocks 50. Downwardly extending key 50b extends into and mates with the keyway 48a in blocks 48. Similarly, the next set of blocks 52 also forms a ring of lesser diameter than that of the layer formed by blocks 50. Blocks 52 have a downwardly extending circular key 52b that similarly engages a corresponding keyway 50a in the preceding layer formed by blocks 50. The next successive layer of blocks 54 have a circular key 54b that similarly mates with a circular keyway 52a in blocks 52. The final layer of blocks 56 is positioned upwardly and inwardly from the layer of blocks 54. Blocks 54 have a horizontal bevel 54a on their upper surface. Blocks 56 have an outwardly extending flange portion 56b that overlies the bevel 54a. Thus, each successive layer of blocks from the layer formed by blocks 48 through the layer formed by blocks 56 are keyed into the next preceding layer and restrained from falling downwardly or inwardly as differential expansion of the refractory materials occur.

A second hemispherical layer of blocks 60 may be positioned outwardly from blocks 40 to 56. These blocks are conventional in design that have slightly beveled edges to mate to form the hemispherical curve.

Based on studies of the prior failure in refractory vessels used for gasifiers, it has been found that the refractory liner 20 must be allowed to expand outwardly and upwardly a certain distance, otherwise the inner surface of the refractory will fail due to excess spalling and cracking caused by the vertical and radial expansion. On the other hand, the refractory liner cannot be allowed to expand too quickly, or the growth rate will exceed the structural limitations of the liner and will ultimately lead to structural failure. It has been postulated for the alumina-type refractory materials that if a predetermined resistance to expansion is provided, the thermal expansion rate can be inhibited in a controlled manner while still allowing sufficient expansion to eliminate excess spalling from the inner surface of the refractory. This internal compression stress (ICS), that is resistance against expansion, may be defined by the formula (for the cylindrical section)

$$ICS = \frac{2 \times \text{yield stress} \times \text{shell thickness}}{\text{shell diameter}}$$

wherein the yield stress is yield stress of the a stainless steel metal shell used in a prior art, thickness is the thickness of the metal shell used in a prior art, and D is the diameter of the metal shell used in a prior art. For a typical refractory vessel used in a gasifier, this will result in an internal compression stress of about 2 MPa. This internal compression stress can be provided by a crushable liner 40 that has a yield stress of about 2 MPa at 65% strain, defined as (initial thickness−final thickness)/initial thickness.

When that yield stress is exceeded, the crushable liner will irreversibly compress but will still resist radial expansion of the refractory liner 30 with a force equivalent to the internal compression stress.

The yield stress of the crushable layer may be varied, depending upon the composition of the refractory material, the composition of the outer shell, as well as the dimensions of the vessel. In practice the yield stress is maintained in the range of from 0.5 to 4.0 MPa, more preferably from 1.0 to 3.0 MPa, and most preferably from 1.5 to 2.5 MPa.

One material that will function in this environment is foam material available under the trademark Fecralloy™ FeCrAlY, which is an iron-chromium-aluminum-yttrium alloy. This material is an alloy with nominal composition by weight %, respectively, of __72.8__% iron, __22__% chromium, __5__% aluminum, and __0.1__% yttrium and 0.1% zirconium. This metal foam is produced commercially by Porvair Fuel Cell Technology, 700 Shepherd Street, Hendersonville, N.C. It has further been found that the yield stress of this metal foam, that is the compression stress at which the material will irreversibly begin to compress, can be varied depending upon the density of the foam. For example, a foam having a density on the order of 3-4% relative density will have a yield strength of about 1 MPa. A material having a relative density of about 4.5-6% will have a yield strength of approximately 2 MPa, while a material having a relative density greater than about 6% will have a yield strength of about 3 MPa or greater. Thus, a material having a yield strength of about 2 MPa has been found to be most desirable for use as a crushable liner 40 for refractory vessels used in the gasifier environment. Other metal foams composed of stainless steel, carbon steel, other suitable metals and metal alloys that have the foregoing properties can also be used.

As the alumina refractory material is exposed to process conditions, over time the typical refractory liner will expand about 1 inch in the radial direction per year. It is therefore desirable to provide a crushable liner 40 that has an original thickness which allows a compression of 1 inch while providing a yield strength of less than or equal to 2 MPa.

Another desired characteristic of the crushable liner 40 is that it must be sufficiently conductive so as to maintain the temperature of the crushable liner under approximately 600° C. It has been postulated that below this temperature, certain species produced in the gasifier will condense to a solid. If such condensation is allowed to occur in the foam lining, it will fill with solid over time and lose its crushability, therefore becoming ineffective to selectively resist expansion of the refractory liner. It has been found that the composite metal foams just described have an adequate thermal conductivity on the order of 0.5 W/mK to maintain the outer surface of the brick at a temperature under 600° C. Thus, any gaseous species will condense in the refractory itself, as opposed to the metal foam, thus allowing the metal foam to retain its selective crushability.

The metal from which the shell 12 is made can be carbon steel, stainless steel, or any other suitable alloy. One of ordinary skill will be able to choose other crushable materials that will exhibit the controlled crushability characteristics of the metal foam after understanding the requirements for controlled crushability and substantially constant resistance to expansion over the limited distance between the refractory material and the outer shell of the vessel, as outlined above.

While the preferred embodiment of the invention has been illustrated and described, it will be appreciated that various changes can be made therein without departing from the spirit and scope of the invention.

What is claimed is:

1. A refractory liner for a vessel comprising:
   a generally cylindrical metal shell having a dome;
   a refractory liner having a cylindrical portion spaced inwardly from said shell and a dome portion spaced inwardly from the dome of said shell, said refractory liner being sized to provide an expansion gap between said liner and said shell; and a selectively crushable material positioned in said gap, said material having a predetermined yield stress that will provide controlled resistance to expansion of said refractory liner resulting from the chemical growth of said liner, said material extending along the entire height of the shell an the liner.

2. The apparatus of claim 1, wherein said yield stress ranges from 0.5 to 4.0 MPa.

3. The apparatus of claim 1, wherein said yield stress ranges from 1.0 to 3.0 MPa.

4. The apparatus of claim 1, wherein said yield stress ranges from 1.5 to 2.5 MPa.

5. A refractory liner for a vessel comprising:
   a generally cylindrical metal shell having a dome;
   a refractory liner having a cylindrical portion spaced inwardly from said hell and a dome portion spaced inwardly from the dome of said shell, said refractory liner being sized to provide an expansion gap between said liner and said shell; and a selectively crushable material positioned in said gap, said material having a predetermined yield stress that will provide controlled resistance to expansion of said refractory shell resulting from the chemical growth of said liner, wherein said crushable material comprises and crushable metal foam.

6. The apparatus of claim 5, wherein said foam comprises an alloy of iron, chromium, aluminum and yttrium.

* * * * *